United States Patent
Fenney

(10) Patent No.: US 11,810,240 B2
(45) Date of Patent: Nov. 7, 2023

(54) METHODS AND SYSTEMS FOR CONSTRUCTING RAY TRACING ACCELERATION STRUCTURES

(71) Applicant: Imagination Technologies Limited, Kings Langley (GB)

(72) Inventor: Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 1 day.

(21) Appl. No.: 17/375,652

(22) Filed: Jul. 14, 2021

(65) Prior Publication Data
US 2022/0020201 A1 Jan. 20, 2022

(30) Foreign Application Priority Data

Jul. 14, 2020 (GB) .................................... 2010857
Jul. 14, 2020 (GB) .................................... 2010858

(51) Int. Cl.
| | |
|---|---|
| G06T 15/06 | (2011.01) |
| G06F 9/50 | (2006.01) |
| G06T 15/08 | (2011.01) |
| G06T 17/10 | (2006.01) |
| G06T 15/50 | (2011.01) |

(52) U.S. Cl.
CPC ............ *G06T 15/06* (2013.01); *G06F 9/5027* (2013.01); *G06T 15/08* (2013.01); *G06T 15/506* (2013.01); *G06T 17/10* (2013.01); *G06T 2210/21* (2013.01)

(58) Field of Classification Search
None
See application file for complete search history.

(56) References Cited

U.S. PATENT DOCUMENTS

| | | |
|---|---|---|
| 2007/0182732 A1 | 8/2007 | Woop et al. |
| 2017/0287202 A1 | 10/2017 | Wald et al. |
| 2019/0318445 A1 | 10/2019 | Benthin et al. |
| 2020/0051315 A1* | 2/2020 | Laine ................... G06T 17/005 |
| 2021/0390756 A1 | 12/2021 | Muthler et al. |

OTHER PUBLICATIONS

Wald et al., "Using Hardware Ray Transforms to Accelerate Ray/Primitive Intersections for Long, Thin Primitive Types," Proc. ACM Comput. Graph. Interact. Tech., vol. 3, No. 2, Article 17. Publication date: Aug. 2020.
Dietrich et al; "Terrain Guided Multi-Level Instancing of Highly Complex Plant Populations"; IEEE Symposium on Interactive Ray Tracing; Sep. 1, 2006; pp. 169-176.
Wald et al; Distributed Interactive Ray Tracing of Dynamic Scenes; IEEE Symposium on Parallel and Large-Data Visualization and Graphics; Oct. 20, 2003; pp. 77-85.

* cited by examiner

*Primary Examiner* — Nurun Flora
(74) *Attorney, Agent, or Firm* — Potomac Law Group, PLLC; Vincent M DeLuca

(57) ABSTRACT

A computer-implemented method of constructing a ray tracing acceleration structure for a scene defined with respect to an overall coordinate system. The acceleration structure includes a top-level acceleration structure (TLAS) having leaf nodes referencing one or more instances of a bottom-level acceleration structures (BLAS). The method comprises defining one or more TLAS nodes, for each TLAS node, determining a first bounding volume and associating the node with a transformation matrix that maps between the first bounding volume and a second bounding volume in the overall coordinate system.

19 Claims, 10 Drawing Sheets

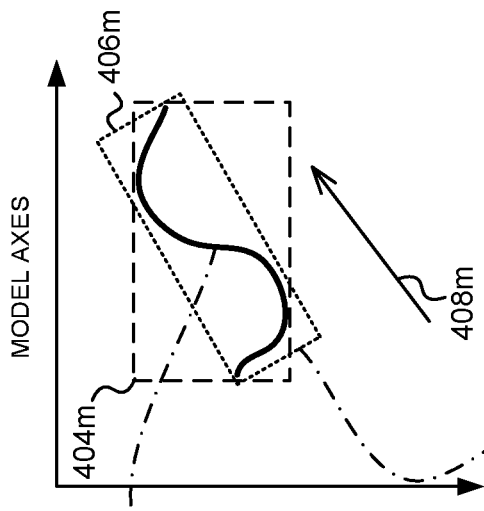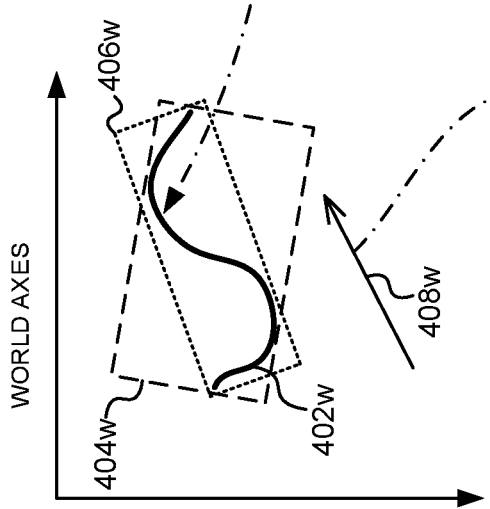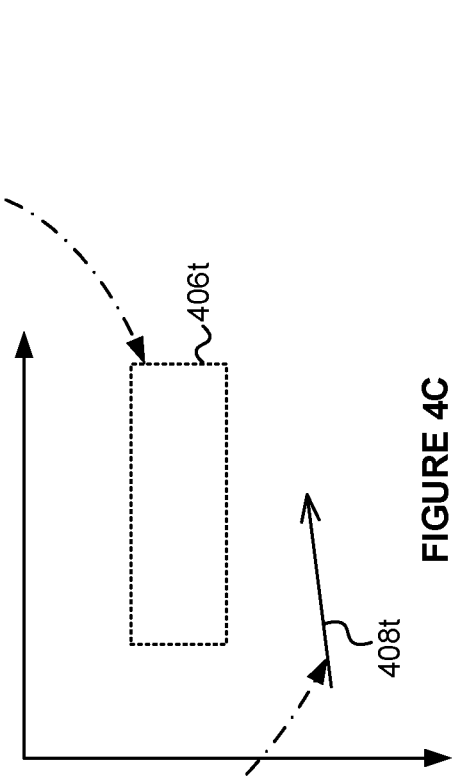

METHODS AND SYSTEMS FOR CONSTRUCTING RAY TRACING ACCELERATION STRUCTURES

TECHNICAL FIELD

The present invention relates to the field of ray tracing.

BACKGROUND

Ray tracing systems can simulate the manner in which rays (e.g. rays of light) interact with a scene. For example, ray tracing techniques can be used in graphics rendering systems which are configured to produce images from 3-D scene descriptions. The images can be photorealistic, or achieve other objectives. For example, animated movies can be produced using 3-D rendering techniques. The description of a 3D scene typically comprises data defining geometry in the scene. This geometry data is typically defined in terms of primitives, which are often triangular primitives, but can sometimes be other shapes such as other polygons, lines or points, and in ray tracing may also comprise spheres, Bezier patches and procedural primitives.

Ray tracing mimics the natural interaction of light with objects in a scene, and sophisticated rendering features can naturally arise from ray tracing a 3-D scene. Ray tracing can be parallelized relatively easily on a pixel by pixel level because pixels generally are independent of each other. However, it is difficult to pipeline the processing involved in ray tracing because of the distributed and disparate positions and directions of travel of the rays in the 3-D scene, in situations such as ambient occlusion, reflections, caustics, and so on. Ray tracing allows for realistic images to be rendered but often requires high levels of processing power and large working memories, such that ray tracing can be difficult to implement for rendering images in real-time (e.g. for use with gaming applications), particularly on devices which may have tight constraints on silicon area, cost and power consumption, such as on mobile devices (e.g. smart phones, tablets, laptops, etc.).

At a very broad level, ray tracing involves: (i) identifying intersections between rays and geometry (e.g. primitives) in the scene, and (ii) performing some processing (e.g. by executing a shader program) in response to identifying an intersection to determine how the intersection contributes to the image being rendered. The execution of a shader program may cause further rays to be emitted into the scene. These further rays may be referred to as "secondary rays".

A lot of processing is involved in identifying intersections between rays and geometry in the scene. In a very naive approach, every ray could be tested against every primitive in a scene and then when all of the intersection hits have been determined, the closest of the intersections could be identified. This approach is not feasible to implement for scenes which may have millions or billions of primitives, where the number of rays to be processed may also be millions. So, ray tracing systems typically use an acceleration structure which characterises the geometry in the scene in a manner which can reduce the work needed for intersection testing. However, even with current state of the art acceleration structures it is difficult to perform intersection testing at a rate that is suitable for rendering images in real-time (e.g. for use with gaming applications), particularly on devices which have tight constraints on silicon area, cost and power consumption, such as on mobile devices (e.g. smart phones, tablets, laptops, etc.).

Modern ray tracing architectures typically use acceleration structures based on bounding volume hierarchies—in particular, bounding box hierarchies. Primitives are grouped together into bounding boxes that enclose them. These bounding boxes are, in turn grouped, together into larger bounding boxes that enclose them. Intersection testing then becomes easier, because, if a ray misses a bounding box, there is no need to test it against any of the children of that bounding box.

In a modern hierarchical approach, two types of acceleration structure can be identified: a Bottom-Level Acceleration Structure (BLAS); and a Top-Level Acceleration Structure (TLAS). A BLAS groups together primitives—that is a BLAS has leaf nodes that are object-primitives (commonly triangles, although other geometric and procedurally defined shapes are possible). The top-level of the BLAS is a single root node. A BLAS can be used to describe a model for a single object in the scene, or a group of objects in the scene for example. A TLAS describes the scene at a high level, starting from a root node at the top-level, and terminating in BLASs at the lowest level. In particular, a TLAS may refer to multiple instances of the same BLAS. For example, a BLAS may model a single chair. A TLAS may model a concert hall and include hundreds of instances of the BLAS for a chair, each instance representing a different chair in the hall, in a different position and/or orientation. The use of instancing in this way provides efficiencies in terms of not having to create the same model multiple times for identical objects.

Intersection testing proceeds by traversing the hierarchy. If a given ray "hits" a bounding box (node), it needs to be tested against each of the children of that bounding box (node). This continues down through the hierarchy until the ray either misses all children of a node, or hits at least one primitive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect there is provided a computer-implemented method of constructing a ray tracing acceleration structure fora scene defined with respect to an overall coordinate system, the acceleration structure comprising a top-level acceleration structure, TLAS, having leaf nodes referencing one or more instances of a bottom-level acceleration structures, BLAS. The method can comprise one or more of: defining one or more TLAS nodes; for each TLAS node, determining a first bounding volume and associating the node with a transformation matrix that maps between the first bounding volume and a second bounding volume in the overall coordinate system.

Optionally, the method further comprises defining a plurality of transformation matrices for the TLAS, and associating the node comprises associating the node with one of the plurality of transformation matrices that maps between the first bounding volume and a second bounding volume in the overall coordinate system. The plurality of transformation matrices can each represent a different, optionally affine, mapping.

Optionally, determining the first bounding volume comprises selecting a bounding volume from a set of candidate bounding volumes. Each candidate bounding volume can be associated with a different one of the plurality of transformation matrices. Further optionally, selecting can comprise comparing the set of candidate bounding volumes and selecting the optimal bounding volume according to a predefined heuristic, and optionally the predefined heuristic can be to select the candidate bounding volume with one of: the smallest volume, the smallest surface area, or smallest cross-sectional area in a specified direction.

Optionally, associating the node with one of the plurality of transformations matrices comprises storing an indication of the respective transformation matrix for the TLAS node, and optionally wherein storing an indication comprises storing an index identifying the particular transformation matrix.

Optionally, the first bounding volume is an oriented bounding volume, and the second bounding volume is an axis-aligned bounding volume. The first bounding volume can be an oriented bounding box and the second bounding volume can be an axis-aligned bounding box, or wherein the first bounding volume can be an oriented ellipsoid and the second bounding volume can be a sphere or an axis-aligned ellipsoid.

Optionally, the method can further comprise using the TLAS for intersection testing in a ray tracing system.

According to a second aspect, there is provided a computer-implemented method of tracing a ray through an acceleration structure for a scene defined with respect to an overall coordinate system, the acceleration structure comprising a top-level acceleration structure, TLAS, having leaf nodes referencing one or more instances of a bottom-level acceleration structure, BLAS. The method can comprise one or more of: evaluating if a ray intersects with a node of the TLAS, the node having a first bounding volume defined in the overall coordinate system, wherein the evaluating comprises: identifying a transformation matrix associated with the node, the transformation matrix representing a mapping between the first bounding volume for the node and a second bounding volume in the overall coordinate system; transforming the ray using the identified transformation matrix, to test if the ray intersects with the node.

Optionally, identifying comprises identifying a transformation matrix from a plurality of transformation matrices defined for the TLAS.

Optionally, the acceleration structure is constructed according to any of the above-mentioned variations of the first aspect.

According to a third aspect, there is provided a ray tracing system configured to construct a ray tracing acceleration structure for a scene defined with respect to an overall coordinate system, the acceleration structure comprising a top-level acceleration structure, TLAS, having leaf nodes referencing one or more instances of a bottom-level acceleration structures, BLAS. The system can comprise a module configured to do one or more of: define one or more TLAS nodes; for each TLAS node, determine a first bounding volume and associate the node with a transformation matrix that maps between the first bounding volume and a second bounding volume in the overall coordinate system; and store in memory the TLAS, including the second bounding volume and the association between the node and the transformation matrix.

Optionally, the module can be further configured to define a plurality of transformation matrices for the TLAS, and wherein associating the node comprises associating the node with one of the plurality of transformation matrices. The module can be configured to define a bounding volume by selecting a bounding volume from a set of candidate bounding volumes. Each candidate bounding volume can be associated with a different one of the plurality of transformation matrices, and/or selecting can comprise comparing the set of candidate bounding volumes and selecting the optimal bounding volume according to a predefined heuristic.

Optionally, storing the association between the node and the transformation matrix comprises storing an index identifying the transformation matrix.

Optionally, the first bounding volume is an oriented bounding volume, and the second bounding volume is an axis-aligned bounding volume. The first bounding volume can be an oriented bounding box and the second bounding volume can be an axis-aligned bounding box, or wherein the first bounding volume can be an oriented ellipsoid and the second bounding volume can be a sphere or an axis-aligned ellipsoid.

According to a fourth aspect, there is provided a ray tracing system configured to trace a ray through an acceleration structure for a scene defined with respect to an overall coordinate system, the acceleration structure comprising a top-level acceleration structure, TLAS, having leaf nodes referencing one or more instances of a bottom-level acceleration structure, BLAS. The system can comprise intersection testing logic configured to do one or more of: identify a transformation matrix associated with a node of the TLAS, the node having a first bounding volume defined in the overall coordinate system, the transformation matrix representing a mapping between the first bounding volume for the node and a second bounding volume in the overall coordinate system; transform a ray using the identified transformation matrix; and evaluate if the ray intersects with the node.

Optionally, the testing logic is configured to identify the transformation matrix from a plurality of transformation matrices defined for the TLAS. The system can be configured to perform the method according to any of the above-mentioned variations of the first aspect.

According to another aspect, there is provided computer readable code configured to cause the method according to any of the above-mentioned variations of the first or second aspects of to be performed when the code is run.

According to another aspect, there is provided a graphics processing system configured to perform the method according to any of the above-mentioned variations of the first or second aspects.

According to another aspect there is provided a computer-implemented method of creating a bounding volume hierarchy, BVH, for a model defined with respect to a local coordinate system for the model. The method may comprise one or more of the steps of: defining a plurality of BVH nodes within the model; establishing a plurality of local transformation matrices for the BVH; and for each of the plurality of BVH nodes, determining a first bounding volume, and associating the node with one of the plurality of local transformation matrices that maps between the first bounding volume and a second bounding volume, in the local coordinate system.

According to another aspect, there is provided a method of constructing a ray tracing acceleration structure for a scene defined with respect to an overall coordinate system, the scene comprising a model defined with respect to a local coordinate system for the model, and wherein the model is instanced in the scene by applying a model transformation matrix for positioning the model in the overall coordinate system, the method comprising one or more of: accessing a plurality of local transformation matrices for a bounding volume hierarchy, BVH, for the model, the BVH comprising a plurality of branch nodes and a plurality of local transformation matrices, each branch node being associated with an OBB and one of the plurality of transformation matrices; and for the instance of the model, updating the local transformation matrices of the BVH to become a set of instance transformation matrices, by combining each individual local transformation matrix with the model transformation matrix, such that the branch nodes of the instance of the model each become associated with one of the instance transformation matrices.

According to another aspect, there is provided a computer-implemented method of tracing a ray through an acceleration structure for a scene defined with respect to an overall coordinate system, the scene comprising a model defined with respect to a local coordinate system for the model, and wherein the model is instanced in the scene by applying a model transformation matrix for positioning the model in the overall coordinate system. The method can comprise one or more of: determining that a ray intersection test is required for a node of the acceleration structure representing the instance of the model; and evaluating if the ray intersects with a node of a bounding volume hierarchy, BVH, for the instance of the model, the node having a first bounding volume defined in the model coordinate system, wherein the evaluating comprises: identifying, from a plurality of instance transformation matrices defined for the BVH, an instance transformation matrix associated with the node, and transforming the ray using the identified instance transformation matrix, to perform a test to find if the ray intersects with the branch node, wherein the identified transformation matrix represents a combination of the inverse of the model transformation matrix and a mapping between the first bounding volume for the node and a second bounding volume in the local coordinate system.

According to another aspect there is provided a ray tracing system configured to create a bounding volume hierarchy, BVH, for a model defined with respect to a local coordinate system for the model. The system can comprise a module configured to do one or more of: define a plurality of BVH nodes within the model, establish a plurality of local transformation matrices for the BVH; for each of the plurality of BVH nodes, determine a first bounding volume and associate the node with one of the plurality of local transformation matrices that maps between the first bounding volume and a second bounding volume in the local coordinate system; and store in memory the BVH, including the second bounding volume and the association between the node and the one of the plurality of local transformation matrices.

According to another aspect a ray tracing system configured to construct a ray tracing acceleration structure for a scene defined with respect to an overall coordinate system, the scene comprising a model defined with respect to a local coordinate system for the model, and wherein the model is instanced in the scene by applying a model transformation matrix for positioning the model in the overall coordinate system. The system can comprise a module configured to perform one or more of: access from a memory a plurality of local transformation matrices for a bounding volume hierarchy, BVH, for the model, created by a ray tracing system according to any of the above-mentioned variations of the fourth aspect; for the instance of the model, update the plurality of local transformation matrices of the BVH to become a set of instance transformation matrices, by combining each individual local transformation matrix with the model transformation matrix, such that the plurality of nodes of the instance of the model each become associated with one of the instance transformation matrices; and store in memory the set of instance transformation matrices.

According to another aspect, there is provided a ray tracing system configured to trace a ray through an acceleration structure for a scene defined with respect to an overall coordinate system, the scene comprising a model defined with respect to a local coordinate system for the model, and wherein the model is instanced in the scene by applying a model transformation matrix for positioning the model in the overall coordinate system. The system can comprise intersection testing logic configured to do one or more of: determine that a ray intersection test is required for a node of the acceleration structure representing the instance of the model; identify, from a plurality of instance transformation matrices defined for a bounding volume hierarchy, BVH, an instance transformation matrix associated with a node of the instance of the model having a first bounding volume defined in the model coordinate system, wherein the identified transformation matrix represents a combination of the inverse of the model transformation matrix and a mapping between the first bounding volume for the node and a second bounding volume in the local coordinate system; transform the ray using the identified instance transformation matrix; and evaluate if the ray intersects with the node.

The ray tracing graphics processing system may be embodied in hardware on an integrated circuit. There may be provided a method of manufacturing, at an integrated circuit manufacturing system, a ray tracing graphics processing system. There may be provided an integrated circuit definition dataset that, when processed in an integrated circuit manufacturing system, configures the system to manufacture a ray tracing graphics processing system. There may be provided a non-transitory computer readable storage medium having stored thereon a computer readable description of a ray tracing graphics processing system that, when processed in an integrated circuit manufacturing system, causes the integrated circuit manufacturing system to manufacture an integrated circuit embodying a ray tracing graphics processing system.

There may be provided an integrated circuit manufacturing system comprising: a non-transitory computer readable storage medium having stored thereon a computer readable description of the ray tracing graphics processing system; a layout processing system configured to process the computer readable description so as to generate a circuit layout description of an integrated circuit embodying the ray tracing graphics processing system; and an integrated circuit generation system configured to manufacture the ray tracing graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 4A-4C illustrates different ways a ray intersection test may be performed;

Figure 1:
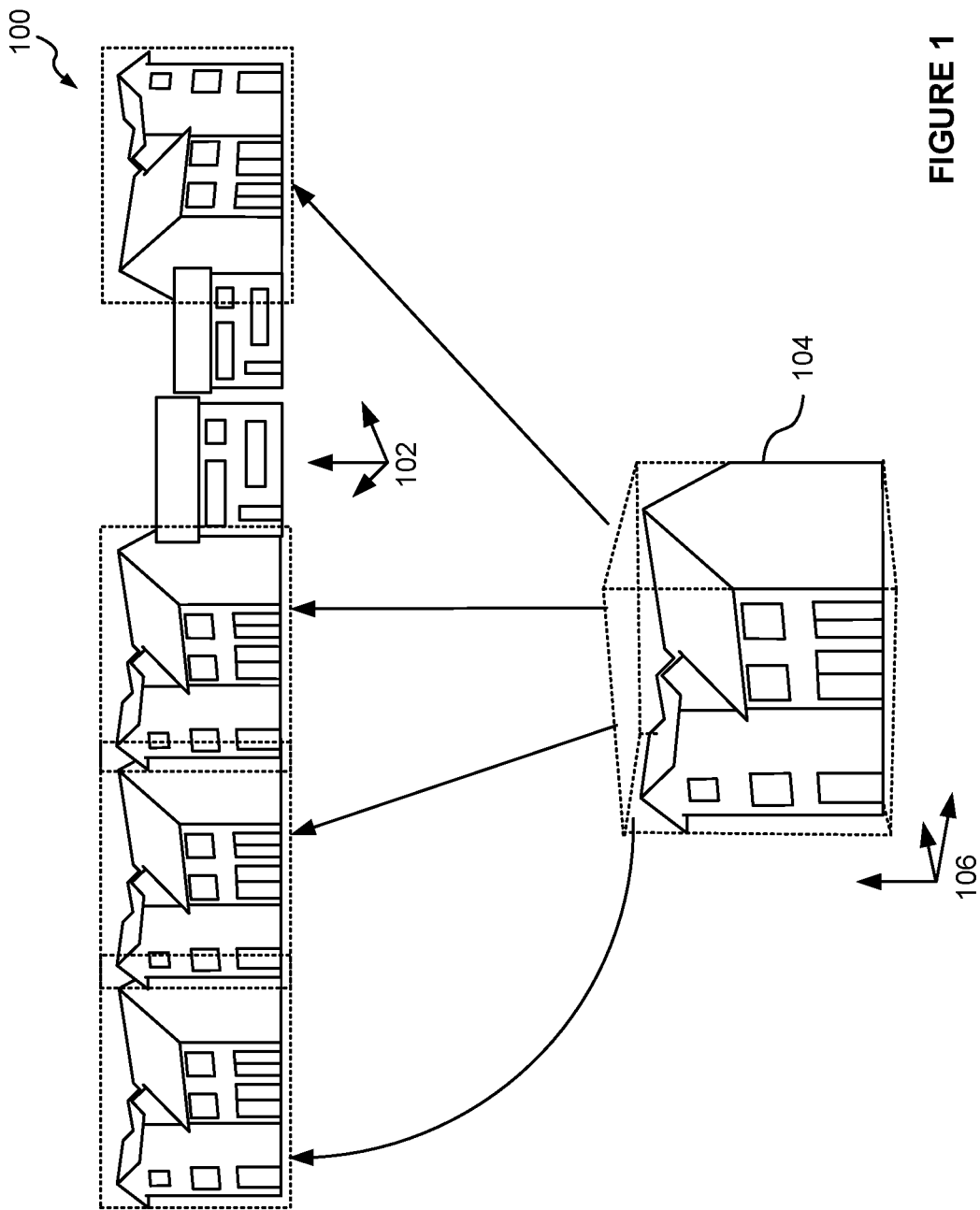
FIG. 1 shows a model being instanced multiple times in a scene to be ray traced.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

As mentioned above, modern ray tracing systems take a hierarchical approach to building acceleration structures to assist in performing intersection testing. A scene is represented in world space (i.e. an overall coordinate system defined for the whole scene) by a combination of a top-level acceleration structure (TLAS) and one or more bottom-level accelerations structures (BLAS). Both the TLAS and the BLAS may have their own acceleration structures in the form of bounding volume hierarchies (BVHs). As such, the top-level acceleration structure may be subdivided into sub-volumes or nodes in a hierarchical manner with the nodes in the lowest hierarchical level in the TLAS each referring to a bottom-level acceleration structure (BLAS). For ease of reference, the bottom-level nodes may also be referred to as leaf nodes (with higher level nodes being termed branch nodes). Bottom-level acceleration structures are models representing, for example, individual objects or collections of objects. Leaf nodes of a BLAS are the geometric or procedural primitives used to construct the model. A single BLAS may be referenced, or "instanced", multiple times by different (or even the same) TLAS nodes.

FIG. 1 shows a scene 100 that illustrates the use of instancing. The scene 100 has a world space, or overall, coordinate system indicated by axes 102. Within the world space coordinate system, several instances of a model 104 have been positioned to contribute to the overall scene 100. The model 104 is defined within its own model coordinate system (or "local" coordinate system) indicated by axes 106. It can be seen that the axes 106 of the model space are different to the axes 102 of the world space. Each instance of the model 104 is positioned in the scene 100 by referencing the model (e.g. by a pointer) in combination with a transformation. The transformation can be defined as a matrix that determines the position of the model instance in world space (i.e. where the model appears with respect to the three-dimensional axes 102 of the overall coordinate system), as well as other affine operations such as rotations, reflections, or stretches of the original model 104. For example, in scene 100, the instance of model 104 on the righthand side of the scene is not only transformed by a particular translation within the world space, but also by a reflection of the basic model 104. For completeness, it is noted that the boxes around the instances of the model in the scene are to guide the eye only, and appear to overlap due to the perspective of the scene. The overlapping boxes are not intended to indicate overlapping instances.

Figure 2:
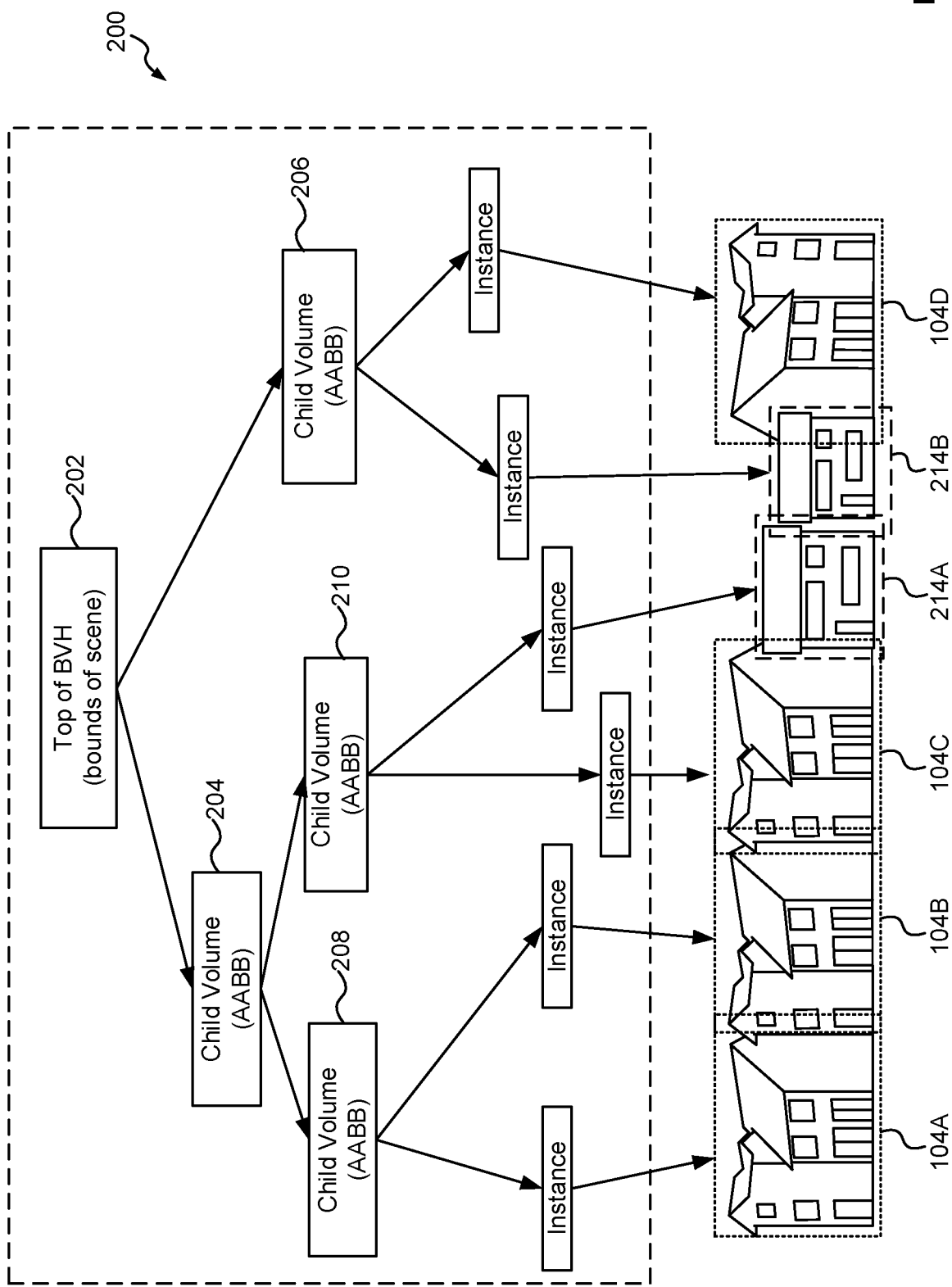
FIG. 2 shows an acceleration structure for the scene presented in FIG. 1.

FIG. 2 illustrates how the scene of FIG. 1 may be broken down in terms of an acceleration structure 200 for ray tracing. The lowest level of the acceleration structure 200 in FIG. 2 is shown as referring to instances of the model 104 (instances 104A-D), as well as instances of a second model (instances 214A and 214B). As the acceleration structure shown at 200 finishes by referring to instances of models, it is effectively a top-level acceleration structure (and the models referenced by those instances in the TLAS would be described by bottom-level acceleration structures, with their own bounding volume hierarchies, which are not shown).

The top-level of the acceleration structure 200 is a node 202, which may also be termed the root node. Node 202 effectively represents the entire scene. However, the scene is further subdivided into smaller sections or volumes, at a larger granularity than the instances of the individual models. As such, there are further branch nodes 204 and 206 representing sub-volumes within the overall scene 100 at the next level down in the acceleration structure. These branch nodes may then further subdivide to lead to further child branch nodes (e.g. node 204 links to nodes 208 and 210). Alternatively, the nodes may reference model instances (for example as shown by nodes 206, 208 and 210)—i.e. they may reference leaf nodes of the TLAS. Although not shown, a given branch node may also refer to both child branch nodes and child leaf nodes. For completeness, it is noted that FIG. 2 illustrates the acceleration structure as a binary tree for simplicity, but it is not necessary for an acceleration structure to be defined as a binary tree and alternative acceleration structures may be in the form of an N-ary tree for example.

The acceleration structure 200 can be used to assist in determining if a ray intersects with any of the objects in the scene 100. By way of example, a ray entering the scene would start at node 202 and be scheduled for testing against nodes 204 and 206, being the child nodes of node 202. In this context, being tested against a node means determining if the ray intersects the bounding volume of the node.

If, for example, not all of scene 100 was encapsulated by the bounding volumes of nodes 204 and 206 (e.g. because part of the scene 100 contains empty space not allocated to either node) and neither node was found to be intersected, the ray would be found to miss the objects in the scene, and no further traversal through the acceleration structure would be required (although it is noted that that does not mean that all ray tracing operations are necessarily terminated—for example a "miss shader" might be called to determine how to represent the miss).

By contrast, if one (or more, if the nodes have overlapping bounding volumes) of the nodes is found to be intersected, the child nodes of the intersected node will be scheduled to be tested against the ray. This is repeated, into the BLAS instances and (within the BVHs of those instances) down to the level of the individual primitives making up the models.

As such, it can be understood that determining the eventual primitive that a ray intersects can require testing the ray against many nodes higher up in the acceleration structure, many of which will be found to be missed. However, this is still more efficient than testing each ray against every primitive directly—it will be appreciated that determining a miss for a node at a high level in the hierarchy avoids the need to test any child nodes (and child nodes of child nodes, etc.) and thus any primitives encapsulated by those nodes.

Whether or not a ray intersects a node depends upon the bounding volume associated with that node. Different shapes of bounding volumes are possible, but modern systems tend to rely on box-shaped bounding volumes as they are both relatively space efficient and relatively straightforward computationally for testing against a ray. By way of comparison, spherical bounding volumes may require fewer values to define than a box, and may be computationally simpler to test for intersection with a ray, but they can be very inefficient for bounding objects. Even, for example, a circular object such as a wheel is relatively poorly bounded by a sphere (i.e. there is a lot of empty volume within the sphere) when viewed from perpendicular to the wheel axis, even if the sphere appears to bound the wheel tightly when viewed parallel to the wheel axis. Inefficient bounding is undesirable because it leads to false positives (by which it is meant, in the context of the present document, the determination of a hit for the bounding volume, when the ray will miss the underlying primitives or child bounding volumes within the bounding volume) when performing intersection testing. That is, a ray will be correctly determined to intersect the bounding volume even if it does not actually intersect the object represented by the bounding volume. To a certain extent this is inevitable—to avoid it entirely the bounding volume would have to be synonymous with the object's surface, at which point one arrives back at effectively testing the ray against every individual primitive. So, there is a balance to be struck, and bounding boxes are generally favoured as fulfilling this balance.

Bounding boxes can be further divided into two types. Axis-aligned bounding boxes (AABBs) are, as the name suggests, defined by faces/edges parallel to the axes of the coordinate system the box is defined in. Oriented bounding boxes (OBBs) are not necessarily so-aligned—i.e. they can be at angles to the axes of the coordinate system (although an OBB may be an AABB if that is the optimal orientation). This means that an OBB can more tightly bound an object (e.g. form a box of smaller volume) than an AABB, because there is more freedom as to how to arrange the box around the object. As discussed above, such tighter bounding can lead to fewer false positive hits, which improves efficiency of traversal through the acceleration structure.

Figure 3C:
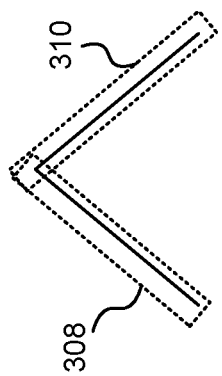
FIGS. 3A-3C illustrates how axis-aligned bounding boxes (AABBs) and oriented bounding boxes (OBBs) can be used to bound parts of a model.
Figure 3B:
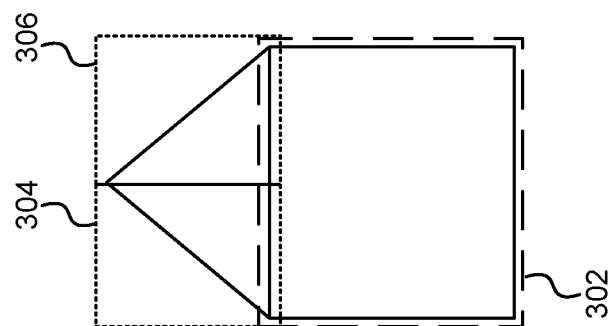
Figure 3A:
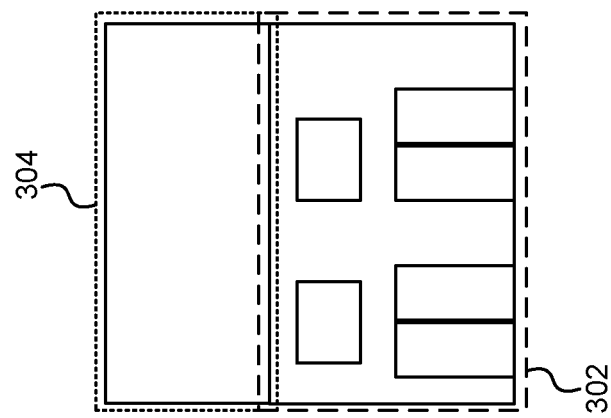

FIGS. 3A-3C illustrates how AABBs and OBBs have different benefits. FIGS. 3A and 3B are front and side elevations of a model house. The model is shown in FIGS. 3A and 3B as being subdivided to include AABBs 302, 304 and 306. The AABB 302 closely bounds the main body of the house in the model, making it a desirable bounding volume for that part of the model (it is noted that the bounding boxes are shown spaced away from the walls of the house, for ease of understanding, but in the case of box 302 it could be drawn right up besides the house walls). That is, AABBs work particularly well when the underlying geometry is well aligned with the local axes. However, the sloping roof section of the model is more problematic. Even dividing the roof into two parts, front and back, the two AABBs 304 and 306 still include significant empty space (as best seen in FIG. 3B)—a large proportion of AABBs 304 and 306 are empty space, which in turn means that many rays found to intersect those AABBs might not intersect the underlying geometry of the roof. In this situation, the surface of the roof might be better represented by two OBBs—illustrated as 308 and 310 in further side elevation FIG. 3C. Based solely on how well a box bounds the underlying geometry, therefore, it can be seen that OBBs can be beneficial when the underlying geometry is not well aligned to the local axes.

However, AABBs are also advantageous in the sense that they can be stored with fewer values (as there is no need to store the axes for each box). An AABB can be stored by 6 values per box, whereas an OBB requires 12 values if the axes are to be stored explicitly with the OBB. This is significant when considering the impact of fetching bounding box data for performing ray tracing for many rays and/or complex hierarchies. It is also computationally simpler to perform intersection tests for AABBs, compared to OBBs (e.g. because coordinates of faces are more likely to include zeros or ones, particularly if unit AABBs are used). A further advantage of AABBs is that the parent AABB for a set of child AABBs is relatively simple to calculate (i.e. by determining the maximum/minimum distances along the axes of the child AABB faces).

As a result of the considerations above, conventional ray tracing systems have usually used AABBs for building acceleration structures. However, it has now been identified that the introduction of instancing in modern ray tracing systems opens a possibility for combining some of the benefits of both OBBs and AABBs.

As explained above, instancing allows utilisation of the same model multiple times in world space. Even if a particular scene makes no use of multiple versions of the same model, the scene will still be built by taking a model built in its own local coordinate system and transforming it to a position it in the world space. That is, ray tracing architectures have to perform a transformation on a model to place it into world space, irrespective of whether the model is used multiple times.

Considering a model with a bounding volume hierarchy (BVH) constructed of AABBs, the model is instanced within a scene by a reference to the underlying model and a model to world space transformation matrix (e.g. a 4×3 matrix in a homogeneous coordinate representation). The model to world space transformation matrix (also referred to herein as a model transformation matrix) is defined to place that model and its associated BVH in the world space. As the model will be arranged arbitrarily in world space, it will be appreciated that, following transformation, the AABBs of the model BVH in the model coordinate system effectively become OBBs in the world space coordinate system. It will also be understood that transforming the model into world space using a given matrix, to test against a ray defined in world space is mathematically equivalent (in terms of determining whether an intersection occurs) to transforming that same ray by the inverse of that given matrix, to test the ray against that same model defined in the model coordinate system. As a result, when performing intersection testing with rays, it is therefore beneficial to actually transform the ray into the coordinate system of the model, by using the inverse of the transformation matrix that places the model in world space. That is, it is beneficial to perform the tests that way so that the computational advantages of testing against AABBs can be realised. This also avoids the need to transform the whole BVH into the world space, allowing the same BVH to be re-used for each instance of the model.

As a result, irrespective of whether the ray is transformed to the model space or the model is transformed to the world space, an instancing-based ray tracing system has to retrieve a matrix and perform a transformation every time it is desired to test against an instanced model. Moreover, as mentioned above, every model must be treated as instanced, even if it is only used once. It has thus been realised that the transformation that is thus always performed can be exploited to provide further benefits. In particular, given that the system requires a mechanism for performing these transformations, a further transformation can be included (which may be mathematically combined with the existing transformation being performed) to allow efficient use of OBBs. By determining an OBB for a node within a model that is to be instanced, and by realising that a transformation is required to bring a ray into the coordinate system of the model anyway, a further transformation can be combined into one matrix operation to be applied to the ray to account for a transformation between the OBB and an AABB in the model system. As a result, the transformed ray can effectively be tested against an AABB, even though an OBB was originally determined for the underlying geometry.

This is further illustrated in a 2D example in FIGS. 4A-4C. FIGS. 4A-4C shows aspects of the same ray intersection system in different coordinate systems, with the same element in different coordinate systems represented by the same reference number with a different letter suffix ('w' for the world space of FIG. 4A, 'm' for the model space of FIG. 4B, and 't' for the transformed space of FIG. 4C). FIG. 4A shows an object 402w that is positioned in world space. An AABB 404w as defined in model space for the object, is also shown. Because the AABB is defined in model space, and the model has been placed in world space by applying a transformation, the AABB 404w is at an angle to the world space axes. An OBB 406w for the object is also shown. In world space, a ray 408w is shown, and it is desired to determine if that ray will intersect with the object 402w. Testing the ray against box 404w in world space will not be as computationally efficient, as discussed above, as testing that same box 404m in the model space, due to the rotation of the box compared to the axes (i.e. box 404 is effectively an OBB in world space, but an AABB in model space). FIG. 4B shows the same system as FIG. 4A, but in the object coordinate system. An arrow representing the transformation matrix, $M_{Obj\_to\_World}$, that transforms the object 402m from the local/model space into world space is also shown extending between the object in FIGS. 4A and 4B. As such, it can be seen that the ray 408m in FIG. 4B has been transformed by the inverse of the transformation that originally placed the object in the world space (and the object in FIG. 4B is now untransformed). It can be seen that the relative orientation of the ray 408 and the object 402 is maintained during the transformation between FIGS. 4A and 4B (and thus the answer to the question of whether the ray intersects the object is unchanged). However, the computational difficulty of the test is reduced in this coordinate system because the box 404m is now an AABB in the relevant (i.e. model) coordinate system for the test. FIG. 4C considers a further transformation that aligns the OBB 406t with the coordinate system, effectively transforming it into an AABB. An arrow representing the transformation matrix, $M_{OBB\_to\_AABB}$, that performs this transformation is also shown extending between the OBB in FIGS. 4B and 4C. Again, it can be seen that applying this transformation to both the OBB 406 and the ray 408 does not change the relative orientation of the ray and the object, and thus does not change the result of whether the ray will intersect the object. As in FIG. 4B, because the axes of the box 406t are aligned with the axes of the testing coordinate system, and so is effectively an AABB, the test is also relatively computationally simple. However, it can be immediately seen by comparing FIGS. 4B and 4C that testing the ray 408t against the box 406t in FIG. 4C, rather than performing the corresponding test using the box 404m in FIG. 4B, will produce a "miss" of box 406t rather than a "hit" of the box 404m (which would then require further testing of lower level bounding volumes to ultimately establish that the underlying object 402 is not hit). Thus, the test of FIG. 4C provides benefits of both AABBs (in terms of computational ease) and OBBs (in terms of tightly bounding the object and thus earlier detection of misses). This can be implemented in practice, for example, by defining an OBB in model space for a node in terms of a transformation matrix that maps between the OBB and an AABB in model space, and storing that AABB and the associated transformation matrix. The transformation matrix can then be used to transform the ray (along with the inverse of the transformation that originally placed the object in the world space) before testing the ray against the AABB that maps to the OBB through the transformation matrix.

In other words, the test of FIG. 4C effectively exploits the observations that (1) what is important for determining the intersection is the relative orientation of the ray and the bounding volume, and not the orientation of that ray/bounding volume system with respect to the coordinate system, and (2) that the orientation of the ray/bounding volume system with respect to the coordinate system is important to the efficiency of computing that intersection. Moreover, the practical exploitation of these observations identifies that an instance-based ray tracing system is already applying a transformation to every instanced model, and so performing the OBB to AABB transformation can be combined with the existing transformation operation in an efficient manner (as discussed in more detail below, and illustrated in FIGS. 4A-4C, in which an arrow representing the overall transformation to be performed on the ray for intersection testing, equivalent to $(M_{Obj\_to\_World})^{-1}*M_{OBB\_to\_AABB}$, is indicated between FIGS. 4A and 4C). For completeness, it is noted that in practical implementations, as for any mapping between world and object spaces in an instance-based ray tracing system, account needs to be taken of floating-point rounding errors introduced by the transformation, and the effects these errors can have on the results of the intersection tests. However, that is beyond the scope of the present discussion.

However, identifying the optimal OBB for each node in a BVH for a model can be computationally expensive in itself.

Therefore, it has been identified that it is advantageous, when analysing a model to create a BVH, to only use OBBs that can be mapped to an AABB via one of a fixed set or palette of predetermined transformations (e.g. representing rotations or other transformations such as affine transformations). In this context the set is "fixed" in the sense of being a limited number, i.e. fewer (normally far fewer) than the number of nodes (or fewer than just the number of branch nodes) in the model. This is based on the understanding that there is only a small incremental testing benefit to having an OBB offset from an AABB by 1° (in a given direction), for example, whereas for arbitrary geometry the greatest benefits might be expected to be achieved by the option of an OBB offset by 45° to an AABB. That is, in the 1° example, most rays that would intersect the AABB will still intersect the OBB; in contrast, in the 45° example, it might be expected that a significant number of rays that would intersect the AABB would not intersect the OBB. As such, significant advantages in intersection testing (i.e. earlier identification of misses) can be realised by using a relatively small set of alignments for OBBs. The system can store the set of local transformations once for the model in memory, and the OBB can be stored for a node (with the corresponding AABB to which it will be mapped, unless the system assumes a single unit AABB and the transformations account for scaling and translation—but that is likely to be undesirable where there are many nodes in the model) with an indication (e.g. a simple index) of the relevant one of the set of local transformations for the particular node.

The palette of matrices stored with the model BVH may be referred to as a palette or set of "local transformation matrices", as they represent transformations within the local coordinate system of the model, mapping between the OBBs and AABBs in the local coordinate system. The palette may be defined for all the nodes in the BVH or a plurality of nodes representing a subset of all the nodes (e.g. just for branch nodes in the BVH, or just for particular elements of the model such as nested instances, as discussed in more detail below).

Figure 5:
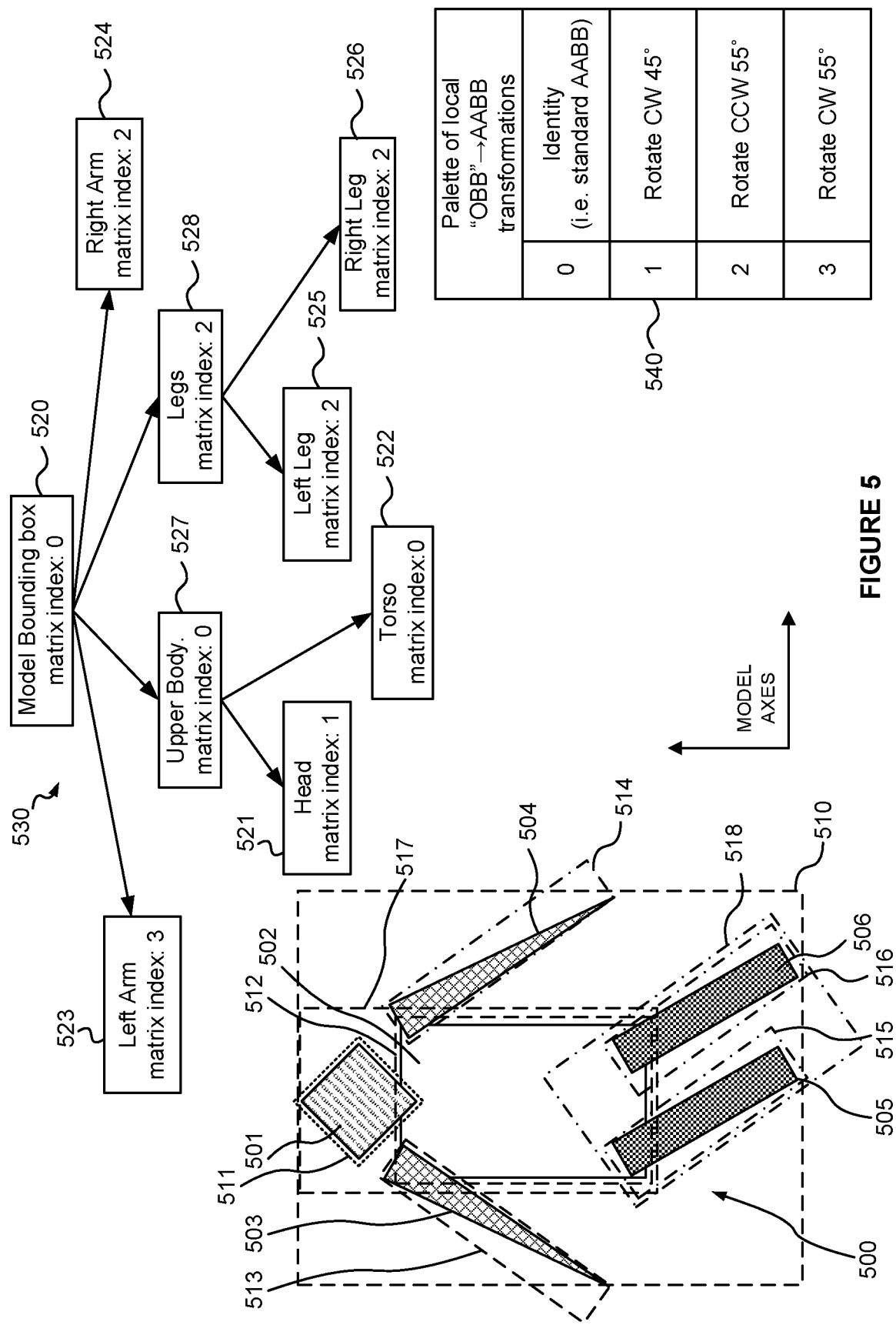
FIG. 5 shows a model with an associated bounding volume hierarchy, acceleration structure, and palette of local transformation matrices.
Figure 7:
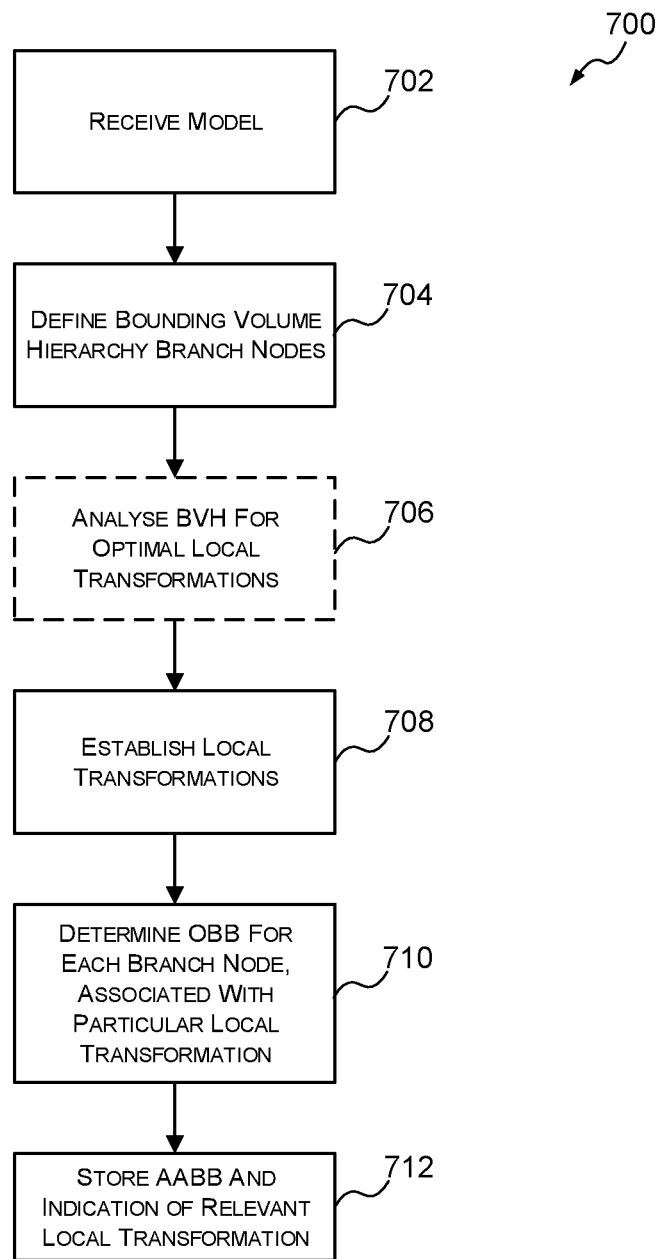
FIG. 7 shows a method for constructing a bounding volume hierarchy.

This approach is illustrated in FIG. 5 and FIG. 7. FIG. 5 shows a basic 2D model of a person 500 with an associated bounding volume hierarchy, whilst FIG. 7 is a flow diagram of method steps. The method 700 of FIG. 7 begins with a step 702 of receiving a model which is to be used in building a scene to be ray traced. It is up to the ray tracing system to define a BVH for the model, although e.g. a developer who created the model may supply hints as to what might be appropriate. In any case, at step 704 the ray tracing system identifies nodes (e.g. regions of the model) to form a BVH structure. Turning to FIG. 5, the BVH is shown in terms of dashed boxes 510-518 over the model 500, as well as a tree diagram 530 (which is a partial acceleration structure—N.B. even the lowermost nodes in tree diagram 530 are still branch nodes, as the diagram does not show nodes for the ultimate primitives within the bounding boxes, and so the tree diagram 530 is not a complete BLAS, but is useful for the purposes of understanding the invention). In the FIG. 5 example, a palette of transformation matrices 540 has been established, which corresponds to step 708 of FIG. 7. How that palette is established is discussed in more detail below. The tree diagram also indicates indices identifying specific ones of the matrices stored in a palette 540, as also discussed below.

To create the bounding volume hierarchy for the model 500, it has been divided into six constituent parts: head 501, torso 502, left arm 503, right arm 504, left leg 505 and right leg 506. It might also be desirable to further group together both legs in a further node, and similarly to group the head and torso into a further node. Having identified the relevant nodes, an OBB for each node is then determined in accordance with step 710 of FIG. 7. Each OBB is related to an AABB in the model coordinate system through one of the local transformation matrices in palette 540. As a result, each constituent part has its own associated bounding volume OBB: head OBB 511, torso OBB 512, left arm OBB 513, right arm OBB 514, left leg OBB 515 and right leg OBB 516. There is also an overall bounding volume for the model 510. The OBBs for the legs are further grouped together in another "parent" legs OBB 518, and similarly a parent upper body OBB 517 is defined for the head and torso. The tree diagram 520 defines this structure as a series of nodes. The root node 520 corresponds to the overall model bounding box 510. This node links to four child branch nodes: upper body node 527, left arm node 523, right arm node 524, legs node 528. The left and right arm nodes 523, 524 have no further child branch nodes associated with them. However, upper body node 527 is associated with two further child (branch) nodes, head node 511 and torso node 512, whilst legs node 528 is associated with child left and right leg nodes 525 and 526.

It is noted that the example of FIG. 5 provides a single bounding volume per node, but this need not be the case. For example, a single acceleration structure node could be defined in respect of both the right leg 508 and the right arm 504. Both of the bounding volumes 518 and 514 could be associated with that notional node. Such an arrangement can be beneficial because it only requires one ray transformation (i.e. for the node) to then perform two ray intersection tests (one against each bounding volume). This saves the cost of a transformation compared to having separate nodes for separate bounding volumes. However, it will be apparent that, according to the present methods, each bounding volume associated with a node would therefore reference the same transformation matrix, which would require further consideration when defining the nodes. For example, legs 505 and 506 could be represented by different bounding boxes within one node, rather than as separate nodes as set out in FIG. 5. Alternatively, it may be appropriate to associate right leg 508 and the right arm 504 into the same node because they would both optimally refer to the same local transformation matrix. However, it may not be desirable to associate those elements with the same node because they are judged to be too far apart (and thus the node would include a lot of empty volume). In contrast it might be desirable for the head 501 and torso 502 to share a node because they are close to each other, but that would not be possible because they do not both share the same optimal local transformation matrix. As such, nodes may or may not be associated with more than one bounding volumes.

It will be seen that the OBBs 510-518 include some boxes that are aligned with the axes of the model coordinate system (so are effectively AABBs) as well as some at other angles. For example, head OBB 511 is rotated 45° to the axes, right arm OBB 514 and the leg OBBs 515, 516 & 518 are rotated 55° counter-clockwise (CCW), and left arm OBB 513 is rotated 55° clockwise (CW). It will also be seen that these OBBs are not necessarily the most perfect OBBs that could be defined (e.g. a tighter OBB could be defined for the right leg 506). However, for each branch node, an OBB has been defined based on the optimal one of the limited set of local transformation matrices established in palette 540. The palette 540 contains a set of transformations that map between an OBB and an AABB in the model coordinate system (it is noted that the mappings are indicated as being from the OBB to the AABB in the example, as also shown in FIGS. 4A-4C, but it will be appreciated that the mappings could be defined in the other direction, with the inversion appropriately accounted for in later calculations). The first transformation (with index 0) is an identity transformation, which would be used for an AABB, and which would also be used for primitive intersection testing.

Stepping away from the example to consider the transformations more generally, the set of transformations may be predefined arbitrarily e.g. representing a selection of transformations expected to yield testing benefits, such as combinations of 45° rotations around the various axes. Alternatively, they may be defined following an analysis of the model. For example the model may be analysed (shown as an optional step 704, represented by a dotted line, in FIG. 7) to determine the optimal OBB for each node, and the spread of ideal OBBs may be used to define a representative set of transformations for the model. As another alternative, a palette of transformations may be built up by using existing transformations (e.g. starting from one equivalent to an AABB) unless it can be determined that a new transformation would allow an OBB to be formed for a node that would fit more than a threshold amount better than by using any of the existing transformations. By way of example, such a threshold might be set as an amount (e.g. absolute, fractional or percentage) of volume reduction compared to that achievable with the best existing transformation in the palette, or an amount of surface area reduction, or an amount of cross-sectional area reduction in a given direction (e.g. the major axis of the OBB or an anticipated primary viewing direction) for example. As still another example, a candidate palette of transformations may be defined (e.g. 20 transformations, representing rotations equivalent to different icosahedral faces), which may be pared down to a final palette (e.g. 4 or 8 transformations) based on the analysis of the model. The best approach will depend on the situation. For example, it might be determined that there is not much benefit to be gained by performing extensive analysis for a small model, or one that is not instanced many times, which is thus likely to be intersected by relatively few rays anyway. In contrast, if it is known that a model will be instanced many times in a scene, it may be worth performing more detailed analysis to choose the palette of transformations, as rays will likely be tested against instances of that BVH relatively often, and so larger gains are obtainable, in terms of speed of completion of the intersection testing for the scene as a whole, by optimisation of the transformation selection. In other situations, it may be undesirable to spend time performing extensive analysis (irrespective of model size or use frequency) and so a predetermined palette of fixed transformations may be used all the time.

It will be apparent from the preceding discussion that the order of steps 704, 706, 708, 710 may vary depending upon the implementation. For example, if an analysis of the model is to be performed to identify the optimal OBBs, the OBBs may be determined before or at the same time as the palette of local transformations. Indeed, the analysis may even precede the definition of the BVH nodes, if it is coupled with an analysis that defines the nodes. As such, it will be appreciated that the disclosure is not limited to a particular order of these steps.

The number of transformations in the palette is limited, but can vary according to need, with different benefits accruing by using relatively few transformations (e.g. simplicity/speed of BVH creation) compared to using a larger number (e.g. tighter fit of BVH to model), and different benefits may be desirable in different circumstances. However, in example implementations, the palette may comprise 4 transformation matrices (e.g. comprising one corresponding to an AABB—i.e. an identity matrix—and three single 45° rotations about each one of three coordinate axes respectively) or 8 transformation matrices (e.g. building on the four from the previous example, and adding three combinations of two 45° rotations, one around each of two different axes, and a further combination of three 45° rotations, one around each of the three axes). Other implementations may employ fewer than 4, or between 4 and 8, or more than 8 transformation matrices.

In some implementations, the transformation matrices may be 3×3 matrices for a 3D system (although other dimension transformations may be used, e.g. if perspective distortions are to be performed). However, for a conventionally 3×3 matrix transformation, there is scope to avoid storing 9 values (e.g. 9 floating point values) for each matrix, depending on the implementation. For example, it may be possible to only store 8 values by relying on an associated AABB for scaling. Alternatively, since the mappings between OBBs and AABBs are primarily rotations, instead of storing each of the transformations as part of the model's acceleration structure as a 3×3 matrix (e.g. of 9 floating point values), transformations could instead be stored as quaternions (e.g. 4 floating point values). This can give some advantage in terms of reducing the data stored for the acceleration structure, but may incur computational penalties if the quaternions need to be converted back to 3×3 matrices to be combined with the model transformation matrix. Whether this is judged worthwhile will depend on the application.

Returning to the example of FIG. 5, the process of determining the OBB for each node of the model 500 may include selecting the OBB from a set of candidate OBBs, for which each candidate OBB maps to a different AABB in the local coordinate system through one of the transformations in the palette 540. The optimal OBB for each node can be selected from the candidate OBBs according to a predetermined heuristic. For example, the selected OBB might be the candidate OBB with the smallest volume, or the smallest surface area, or the smallest cross-sectional area in a specified direction.

In any case, with the established set of local transformations shown in palette 540, the BVH 510 can be defined using OBBs that each map to an AABB through one of the predetermined transformations. Having determined an OBB for a given node, an indication of the relevant one of the local transformation matrices, and the AABB which can be mapped to the OBB using the indicated local transformation matrix, may be associated with the node. The indication of the appropriate transformation matrix can be associated with each node, for example, as an index linked to the palette 530. This is shown in tree diagram 530, for which each box representing a node indicates the relevant index in palette 530. The model and its BVH, with the AABBs and associations to the transformations in the palette, can then be stored in memory with the indexed palette 530, in accordance with step 712 of FIG. 7.

When the model comes to be positioned, or "instanced", in a scene (e.g. as a BLAS within a TLAS) a model transformation matrix is defined for that positioning, to bring the model into the overall world space coordinate system for the scene. Normally, this would be a single matrix transformation, although it could also be done as a combination of matrix transformations. As mentioned above, a ray may be transformed by the inverse of that model transformation matrix to bring the ray into the model coordinate system. To save on matrix operations, once the model is instanced, the individual local transformation matrices can be multiplied by the model transformation matrix (or, if multiple model transformations matrices are being used, the local transformation matrices could be combined with just one of those model transformation matrices), and stored in memory as a set or palette of "instance transformation matrices" associated with that specific instance of the model. In this way, different palettes of instance transformation matrices can be created for different instances of the model (because they will be associated with different model transformation matrices).

When these updated palettes are stored in memory, the indexing of the palettes compared to the original local transformation palette can remain unchanged. That is, if a palette of local transformation matrices is used to produce an instance transformation matrix palette, the matrices with the same index in the two palettes would be related through the model transformation matrix. Put another way, the ordering of the matrices in the palette is preserved. As a result, the indices associated with the nodes in the underlying model BVH will still correctly index the correct matrix in the palette of instance transformation matrices. That is, because the BVH nodes simply indicate which one of matrices in the palette is the appropriate one to use (e.g. by an index), then that indication will continue to point to the correct matrix, after instancing, in the instance transformation matrix palette. In other words, there is no need to modify any of the other data defining the BVH, other than the palette of transformation matrices, to account for the instancing. This maintains the benefits of only having to create the basic model BVH once, for use in multiple instances. In contrast, for example, if the local transformation matrix was stored explicitly for every node, then that would need to be updated for every node, for each new instance, which would be much less efficient.

As such, it will be apparent that an advantage of this system is that each set of instance transformation matrices can be calculated once, once the model transformation matrix is known, rather than repeating the combination of the two transformations (model transformation and local transformation) every time a node in the model BVH is used in intersection testing. In other words, at the point of testing a ray, the ray may be transformed by the appropriate instance transformation matrix for a particular node, in a single operation, rather than by a series of operations applying the appropriate individual local transformation matrix as well as the model transformation matrix. As such, the ray intersection test itself incurs little, if any, additional computational cost compared to a conventional ray tracing system supporting instancing (where a matrix transformation is required to perform the intersection test anyway).

Figure 6:
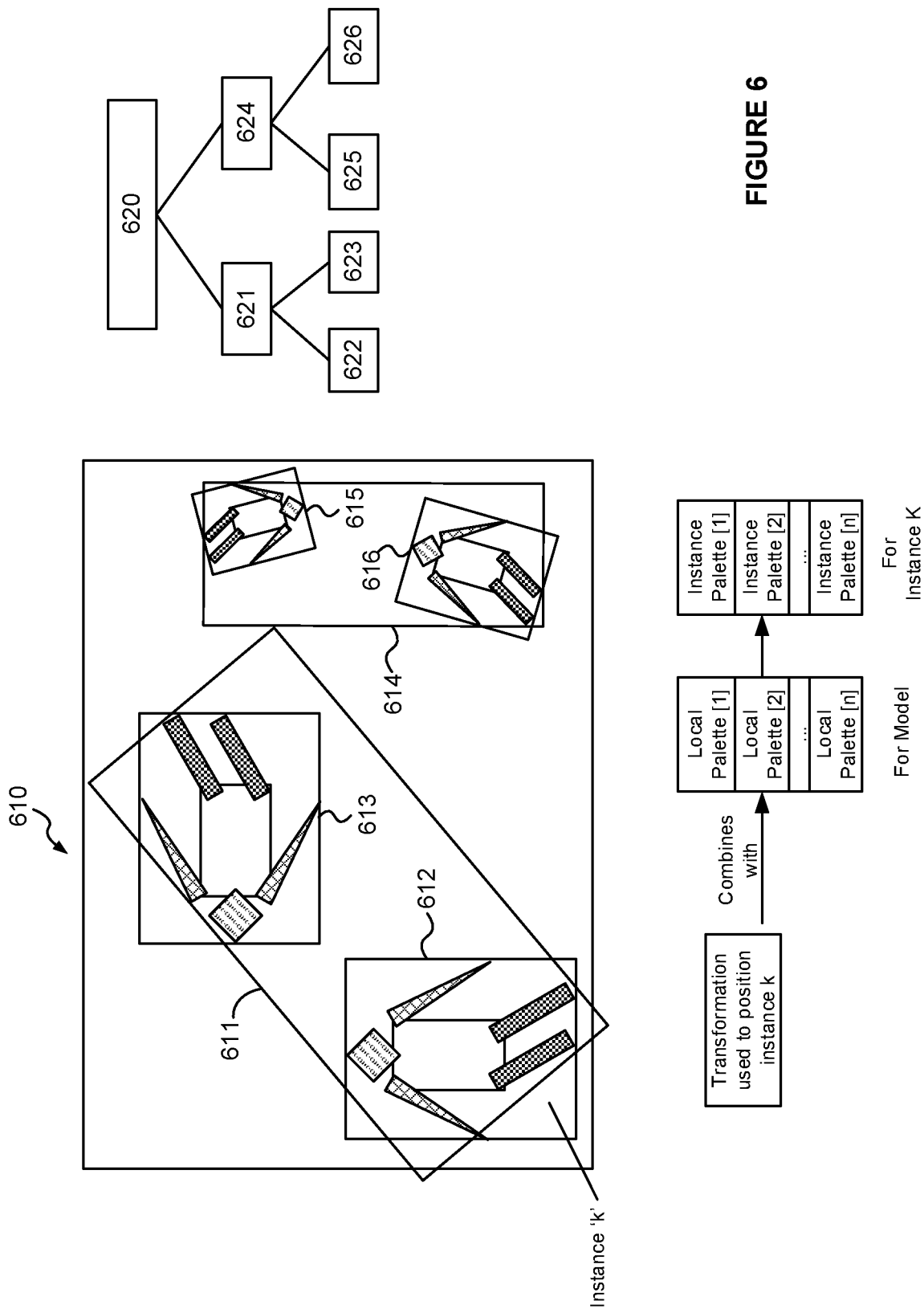
FIG. 6 shows a scene constructed using multiple instances of the model of FIG. 5, with an associated acceleration structure.

FIG. 6 illustrates an example of the instancing discussed above, and FIG. 8 shows a corresponding method of constructing an acceleration structure 800. In FIG. 6 an example 2D scene 610 includes multiple instances of the model 500. The instances may be grouped into an overall acceleration structure, as shown by the boxes in scene 610 and the corresponding tree diagram. Tree node 620 corresponds to overall scene 610, with nodes 621, 622, 623, 624, 625 and 626 corresponding to boxes 611, 612, 613, 614, 615 and 616 respectively. It will be appreciated that nodes 622-626 correspond to the model bounding box 510 and its associated bounding volume hierarchy—in other words the tree diagram is a TLAS, with the bottom level corresponding to instances of a BLAS, being the acceleration structure for the model 500.

Figures 8, 9:
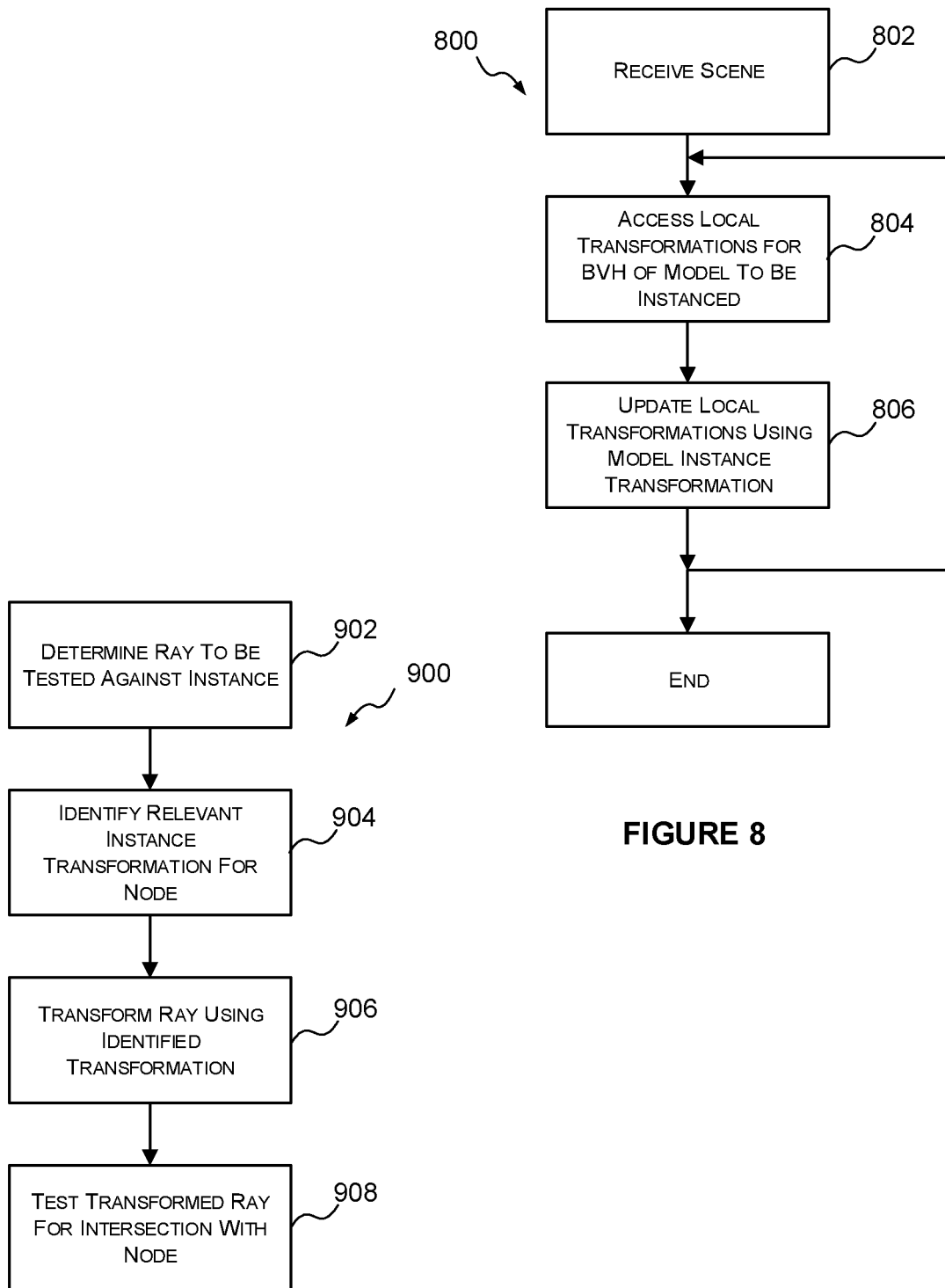
FIG. 8 shows a method for constructing an acceleration structure incorporating model instances.
FIG. 9 shows a method of tracing a ray in a bounding volume hierarchy.

Moreover, each of boxes 612-616 are instances of the model box 510 of FIG. 5, which have been positioned in the scene coordinate space by a model transformation matrix. As shown in the flow diagram at the bottom of FIG. 6, for each instance k, when creating the instance in the scene, the inverse of the model transformation matrix is combined with the palette of local transformation matrices for the model 500 to produce a palette of instance transformation matrices for the particular instance. That is, to construct the acceleration structure for the scene 610 once the scene 610 has been received (step 802 of FIG. 8), for each instance of the model 500, the palette of local transformation matrices for the BVH for the model is accessed (step 804) and the plurality of local transformation matrices of the BVH is updated (step 806) for that instance to become a set of instance transformation matrices. That updating is performed by combining each individual local transformation matrix with the model transformation matrix (N.B that combination may involve combining the inverse of one or more of those matrices with the other, depending on how the transformations are defined) such that the branch nodes of the instance of the model each become associated with one of the instance transformation matrices. As mentioned above, this association with the instance transformation matrices can be achieved without modifying the other data of the BVH if the nodes already referred to the relevant transformation matrices through an index, as that index can then be used to refer to the palette of instance transformation matrices instead. As will also be understood from the above, a different set of instance transformation matrices will be established for each instance of the model 500, as each instancing uses a different model transformation matrix. This is represented in FIG. 8 by the loop around steps 804 and 806, indicating that those steps are repeated for each instance of each model until the acceleration structure is complete.

When it comes to tracing a ray for the scene 610, the instance transformation matrices can be used to transform rays when performing intersection testing with the relevant instance of the model. FIG. 9 illustrates a method 900 of doing this. When a ray is determined (step 902) to intersect with a node of the acceleration structure 620 representing an instance of the model 500 (e.g. one of nodes 622, 623, 625 or 626) it then becomes necessary to evaluate whether the ray intersects with any of the branch nodes of the BVH for that instance of the model. This would be done, in the first instance, for each child node of the root node. Considering just one such branch node, it has an OBB defined in the model coordinate system and stored in terms of an AABB and a reference to a transformation matrix that maps between the AABB and the OBB. The ray tracing system then identifies (step 904) from the palette of instance transformation matrices defined for that model instance, the instance transformation matrix associated with the branch node. This can be achieved, for example using the index stored in memory for the node in the acceleration structure 530. The ray can then be transformed (step 906) using the identified instance transformation matrix. In other words the ray can be transformed in one step by a matrix that represents a combination of the inverse of the model transformation matrix, used to place the particular instance of the model 500, and a mapping between the OBB for the branch node and an AABB in the model coordinate system. Having performed this transformation, an intersection test can be performed (step 908). These steps of tracing a ray may be completed using fixed function intersection testing logic, for example.

The examples above consider ray tracing in the context of instancing individual models. However, it is also possible to have so-called "nested instancing", in which one model includes one or more instances of another model. For example, a scene may comprise multiple instances of the same plant model, but the plant model itself may have multiple instances of the same flower model, which in turn may have include multiple instances of the same petal. However, such conventional nesting can lead to a problem that there is a large number of transformations required to build a scene. That is, referring back to the same example, each instance of the petal model would require a transformation to position it within the flower model, each instance of the flower model would require a transformation to position it within the plant model, and each instance of the plant model would require a transformation to position it at the scene. The combination of nested instances effectively leads to a unique transformation being applied to the lowest level element—in other words, if there are M plants each with N flowers and P petals then there are M×N×P transformation matrices, which would each need e.g. a separate 3×4 transformation matrix.

As a result, nested instancing can lead to there being many transformations that need to be stored. As such, there comes a point where it is preferable to flatten the scene to reduce the number of nested instances (e.g. to just one level of instancing) but this in turn carries a penalty in terms of the size of data required to define each model and thus the overall scene. That is, if the plant model were simplified to remove the nested models of the flower and the petals, the equivalent data for each instance of those models would have to be added to the plant model itself. This reduces the number of transformations required but increases the size of the plant model.

One alternative to flattening the nested instances is to store a hierarchy of the transformations. But this in turn creates a problem when it comes to testing ray intersections, as now each ray must be transformed by a series of matrices, and such matrix operations are costly (as discussed above, where the single matrix operation required to support the instancing of modern ray tracing systems is exploited to provide additional advantages without adding further matrix operations at the point of testing the ray).

Instead, it can be observed that in many common scenarios where nested instancing might be desirable, there is a relatively small number of different orientations required for the nested model. For example, when creating a scene comprising many instances of the same building, the building might be positioned on a grid-like road system, and so the building might only be positioned in one of four rotational positions. Similarly, the building itself may have four sides, each with multiple instances of the same window, but the window will only need to be instanced in one of four orientations corresponding to each of the four sides. In such cases, it will be apparent that the instances may even share the same scale (e.g. the windows are all the same size wherever they appear, and the buildings are all the same size within the overall scene), such that only the translations will differ for instances in the same orientation.

As such, by applying the same principles as discussed above, it can become more manageable to support multiple levels of nesting without incurring the full cost of implementing conventional nesting. That is, for a two-level nesting of e.g. a scene comprising M buildings each with N windows, there is no need to create M×N separate transformation matrices. Instead, the building model may store a palette of (in this case) 4 local transformation matrices (e.g. 3×3 matrices) to account for the rotations and scaling, and only store an additional translation (e.g. only a further 3 floating point values) per each window instance. Then, each window instance (which would be represented by a node in the BVH for the building) can be stored in the building BVH with an indication of the relevant transformation matrix from the palette of transformation matrices. That indication could be an index, which will be less expensive to store than a complete transformation matrix for each nested instance (even accounting for storing the translation values too).

The preceding description has focussed on the use of OBBs and transformations mapping between the OBBs and AABBs, since AABBs are computationally less costly during intersection tests. However, it will be appreciated that the methods and systems described are equally applicable to other geometries, where a first bounding volume can be mapped to a second bounding volume that is less computationally costly for performing intersection tests. In a general sense, any oriented bounding volume (OBV) could be related to an axis-aligned bounding volume (AABV) through the methods described. For example, an oriented ellipsoidal bounding volume for a node could be associated with a transformation to an axis-aligned ellipsoidal bounding volume, or (less flexibly, but computationally cheaper) a spherical bounding volume.

Although the preceding description has focussed on exploiting the transformation already performed when instancing models in a TLAS, it will be appreciated that similar benefits can be obtained when considering the nodes of the TLAS itself in a system that supports BLAS instancing.

TLAS nodes will normally have bounding volumes defined in the world space and are therefore likely to already be defined as AABBs or other AABVs in the world space. As such, there is no strict need for a transformation between coordinate systems when testing a ray for intersection with a TLAS AABV if both the AABV and the ray are defined in world space. However, a hardware ray tracing system may not distinguish between TLAS intersection tests and BLAS intersection tests, in terms of its processing pipeline. In that case, there may effectively be an identity transformation applied to the ray or TLAS AABV when performing the test, so that the same steps are performed as for a BLAS intersection test. Even if that is not the case, the system will necessarily be configured to perform a transformation for the BLAS tests (to cope with instancing), and so that configuration can be extended to cover TLAS tests. As a result, it is possible to incorporate OBV support into TLASs for ray tracing systems supporting instancing in the same way as for the BLASs.

Figures 10, 11:
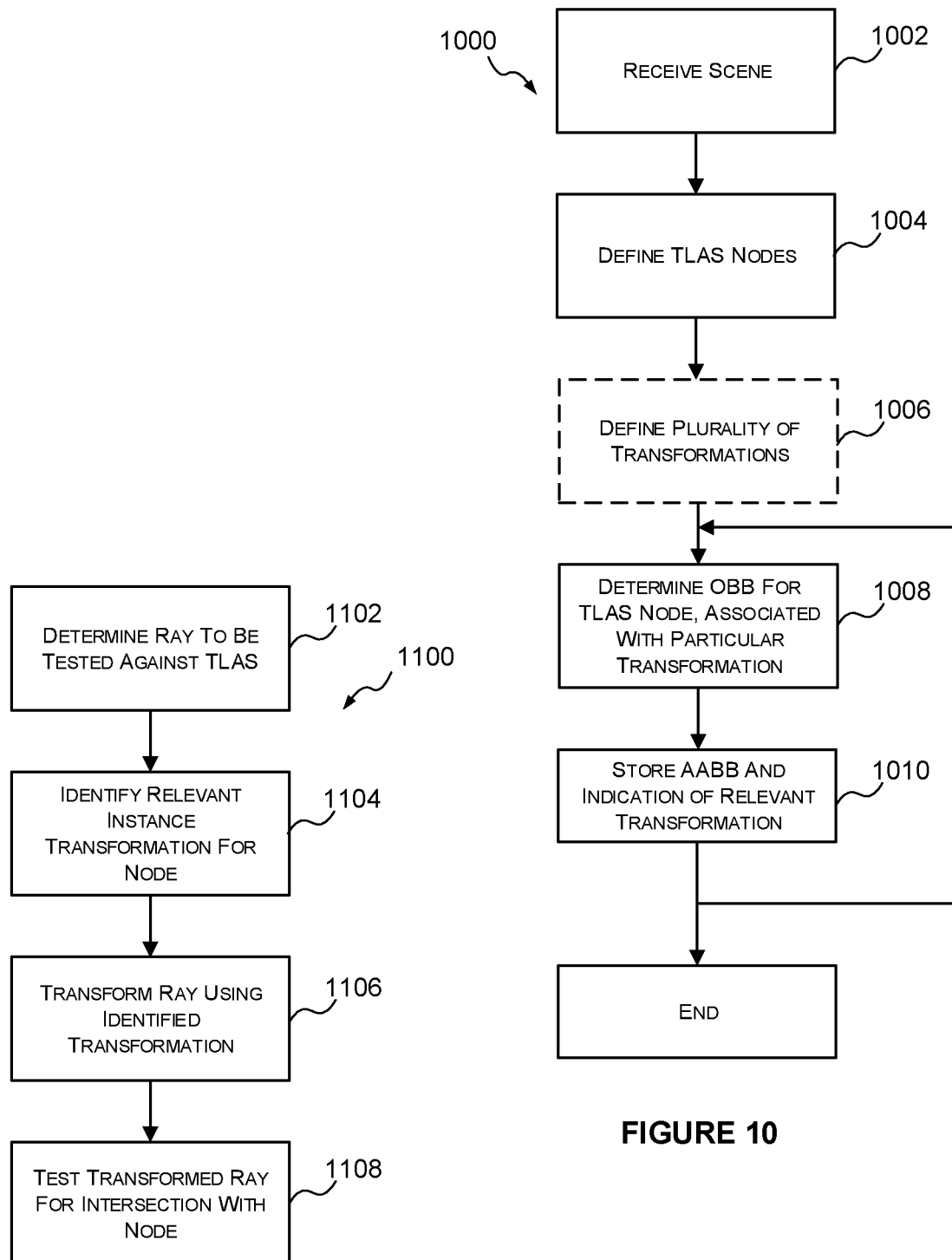
FIG. 10 shows a method for constructing a top-level acceleration structure.
FIG. 11 shows a method of tracing a ray in a top-level acceleration structure.

That is, one or more of transformation matrices can be associated with the TLAS. Compared with the model BVHs, it may be preferable to store one transformation per TLAS node, rather than use a palette of transformations for the TLAS which the nodes reference, as the number of TLAS nodes may be relatively small compared to the numbers in a BLAS. However, in some cases, it may still be desirable to have a palette of transformations. FIG. 10 indicates a method 1000 for creating a TLAS. At step 1002 the scene is received, and at step 1004 the TLAS nodes are defined. As discussed above, it may be optional to define a palette of transformations for the TLAS, so this is indicated as a dashed box for step 1006 in FIG. 10. In any case, for each defined TLAS node, an OBV can be determined and the node can be associated with a transformation matrix that maps between the OBV and an AABV (step 1008). The relevant matrix for each node can be stored (step 1010) in memory through an indication (e.g. through an index if a palette for the TLAS is used), along with the AABV with the TLAS. As indicated in FIG. 10, this can be repeated for each TLAS node.

Similarly, when it comes to tracing a ray through the TLAS, it can be evaluated if a ray intersects with a node of the TLAS, as illustrated in FIG. 11 and method 1100. When it is determined to test a ray against the TLAS (step 1102), the transformation matrix associated with the node can be identified at step 1104 (e.g. through an index stored for the node), the transformation matrix representing the mapping between the OBV for the node and an AABV in the overall coordinate system. The ray can then be transformed at step 1106 using the identified matrix, and then the transformed ray can be used in an intersection test at step 1108.

Figure 12:
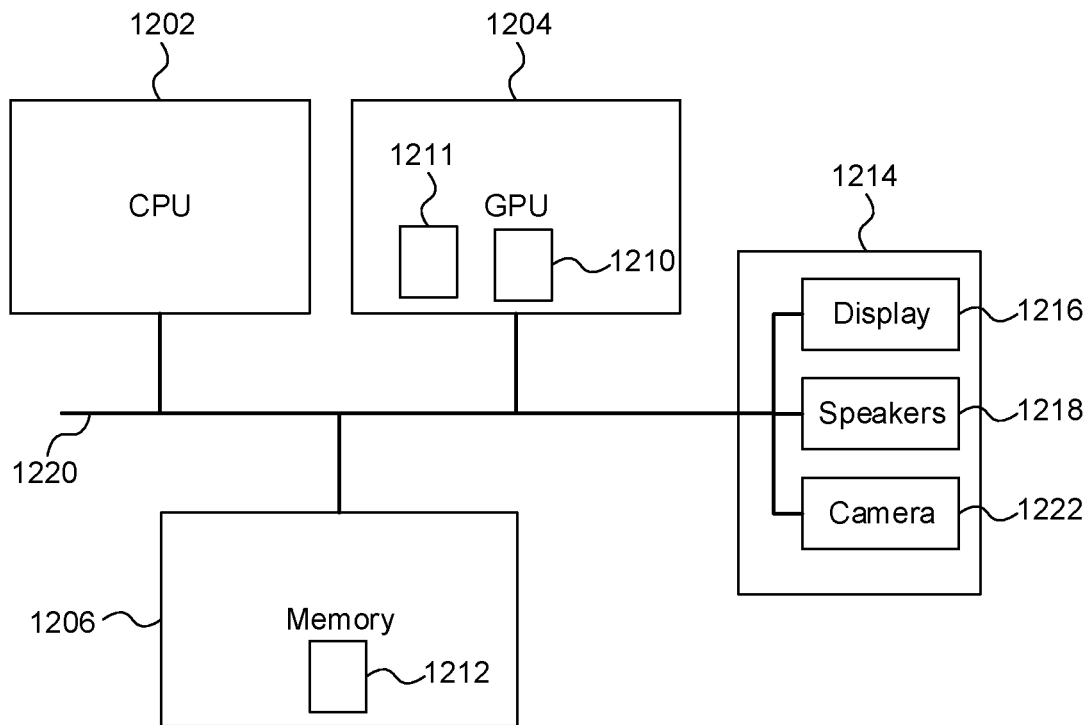
FIG. 12 shows a computer system in which a graphics processing system is implemented.

FIG. 12 shows a computer system in which the ray tracing graphics processing systems described herein may be implemented. The computer system comprises a CPU 1202, a GPU 1204, a memory 1206 and other devices 1214, such as a display 1216, speakers 1218 and a camera 1222. A processing block, or module, 1210 is implemented on the GPU 1204, for performing the methods described herein. In other examples, the processing block, or module, 1210 may be implemented on the CPU 1202. The components of the computer system can communicate with each other via a communications bus 1220. A store 1212 is implemented as part of the memory 1206.

While FIG. 12 illustrates one implementation of a graphics processing system, it will be understood that a similar block diagram could be drawn for an artificial intelligence accelerator system—for example, by replacing either the CPU 1202 or the GPU 1204 with a Neural Network Accelerator (NNA) 1211, or by adding the NNA as an additional unit. In such cases, the processing block 1210 can be implemented in the NNA.

The ray tracing methods of FIGS. 7-11 are shown as comprising a number of functional steps. This is schematic only and is not intended to define a strict division between different logic elements of such steps. Each step may be provided in a hardware system any suitable manner. It is to be understood that intermediate values described herein as being formed during creation of bounding volume hierarchies and acceleration structures may not be physically generated by the ray tracing graphics system at any point and may merely represent logical values which conveniently describe the processing performed by the ray tracing graphics system between its input and output.

The ray tracing graphics processing systems described herein may be embodied in hardware on an integrated circuit. The ray tracing graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing graphics processing system configured to perform any of the methods described herein, or to manufacture a ray tracing graphics processing system comprising any apparatus described herein. An integrated circuit definition dataset may be, for example, an integrated circuit description.

Therefore, there may be provided a method of manufacturing, at an integrated circuit manufacturing system, a ray tracing graphics processing system as described herein. Furthermore, there may be provided an integrated circuit definition dataset that, when processed in an integrated circuit manufacturing system, causes the method of manufacturing a ray tracing graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing graphics processing system will now be described with respect to FIG. 13.

Figure 13:
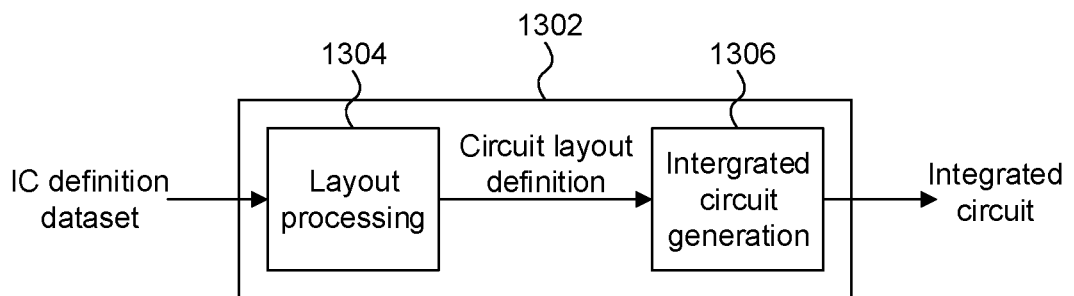
FIG. 13 shows an integrated circuit manufacturing system for generating an integrated circuit embodying a graphics processing system.

FIG. 13 shows an example of an integrated circuit (IC) manufacturing system 1302 which is configured to manufacture a ray tracing graphics processing system as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a ray tracing graphics processing system as described in any of the examples herein), process the IC definition dataset, and generate an IC according to the IC definition dataset (e.g. which embodies a ray tracing graphics processing system as described in any of the examples herein). The processing of the IC definition dataset configures the IC manufacturing system 1302 to manufacture an integrated circuit embodying a ray tracing graphics processing system as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of constructing a ray tracing acceleration structure for a scene defined with respect to an overall coordinate system, the acceleration structure comprising a top-level acceleration structure (TLAS) having leaf nodes referencing one or more instances of a bottom-level acceleration structure (BLAS), the method comprising:

defining one or more TLAS nodes; and for each TLAS node, determining a first bounding volume in the overall coordinate system and associating the node with a transformation matrix that maps between the first bounding volume and a second bounding volume in the overall coordinate system.

2. The method according to claim 1, wherein the method further comprises defining a plurality of transformation matrices for the TLAS, and wherein associating the node comprises associating the node with one of the plurality of transformation matrices that maps between the first bounding volume and the second bounding volume in the overall coordinate system, wherein optionally the plurality of transformation matrices each represent a different, optionally affine, mapping.

3. The method according to claim 2, wherein determining the first bounding volume comprises selecting a bounding volume from a set of candidate bounding volumes.

4. The method according to claim 3, wherein each candidate bounding volume is associated with a different one of the plurality of transformation matrices.

5. The method according to claim 4, wherein selecting comprises comparing the set of candidate bounding volumes and selecting the optimal bounding volume according to a predefined heuristic, and optionally wherein the predefined heuristic is to select the candidate bounding volume with one of: the smallest volume, the smallest surface area, or smallest cross-sectional area in a specified direction.

6. The method according to claim 1, wherein associating the node with one of the plurality of transformations matrices comprises storing an indication of the respective transformation matrix for the TLAS node, and optionally wherein storing an indication comprises storing an index identifying the particular transformation matrix.

7. The method according to claim 1, wherein the first bounding volume is an oriented bounding volume, and the second bounding volume is an axis-aligned bounding volume, or wherein the first bounding volume is an oriented bounding box and the second bounding volume is an axis-aligned bounding box, or wherein the first bounding volume is an oriented ellipsoid and the second bounding volume is a sphere or an axis-aligned ellipsoid.

8. The method according to claim 1, further comprising using the TLAS for intersection testing in a ray tracing system.

9. A computer-implemented method of tracing a ray through an acceleration structure for a scene defined with respect to an overall coordinate system, the acceleration structure comprising a top-level acceleration structure (TLAS) having leaf nodes referencing one or more instances of a bottom-level acceleration structure (BLAS), the method comprising:

evaluating if a ray intersects with a node of the TLAS, the node having a first bounding volume defined in the overall coordinate system, wherein the evaluating comprises:

identifying a transformation matrix associated with the node, the transformation matrix representing a mapping between the first bounding volume for the node and a second bounding volume in the overall coordinate system; and transforming the ray using the identified transformation matrix, to test if the ray intersects with the node.

10. The method according to claim 9, wherein identifying comprises identifying a transformation matrix from a plurality of transformation matrices defined for the TLAS.

11. The method according to claim 9, wherein the acceleration structure is constructed as set forth in claim 1.

12. A ray tracing system configured to construct a ray tracing acceleration structure for a scene defined with respect to an overall coordinate system, the acceleration structure comprising a top-level acceleration structure (TLAS) having leaf nodes referencing one or more instances of a bottom-level acceleration structure (BLAS), the system comprising a module configured to:

define one or more TLAS nodes;

for each TLAS node, determine a first bounding volume and associate the node with a transformation matrix that maps between the first bounding volume and a second bounding volume in the overall coordinate system; and store in memory the TLAS, including the second bounding volume and the association between the node and the transformation matrix.

13. The ray tracing system of claim 12, wherein the module is further configured to define a plurality of transformation matrices for the TLAS, and wherein associating the node comprises associating the node with one of the plurality of transformation matrices.

14. The ray tracing system of claim 13, wherein the module is configured to define a bounding volume by selecting a bounding volume from a set of candidate bounding volumes.

15. The ray tracing system of claim 14, wherein each candidate bounding volume is associated with a different one of the plurality of transformation matrices, and/or wherein selecting comprises comparing the set of candidate bounding volumes and selecting the optimal bounding volume according to a predefined heuristic.

16. The ray tracing system according to claim 12, wherein storing the association between the node and the transformation matrix comprises storing an index identifying the transformation matrix.

17. The ray tracing system according to claim 12, wherein the first bounding volume is an oriented bounding volume, and the second bounding volume is an axis-aligned bounding volume, or wherein the first bounding volume is an oriented bounding box and the second bounding volume is an axis-aligned bounding box, or wherein the first bounding volume is an oriented ellipsoid and the second bounding volume is a sphere or an axis-aligned ellipsoid.

18. A non-transitory computer readable storage medium having stored thereon computer readable code configured to cause the method of claim 1 to be performed when the code is run on at least one processor.

19. A graphics processing system configured to perform the method as set forth in claim 1.

* * * * *

UNITED STATES PATENT AND TRADEMARK OFFICE
CERTIFICATE OF CORRECTION

| | |
|---|---|
| PATENT NO. | : 11,810,240 B2 |
| APPLICATION NO. | : 17/375652 |
| DATED | : November 7, 2023 |
| INVENTOR(S) | : Simon Fenney |

It is certified that error appears in the above-identified patent and that said Letters Patent is hereby corrected as shown below:

In the Specification

Column 2, Line 5, please replace:
are, in turn grouped, together
With:
-- are, in turn, grouped together --

Column 2, Line 47, please replace:
structure fora scene
With:
-- structure for a scene --

Column 5, Line 51, please replace:
another aspect a ray tracing
With:
-- another aspect there is provided a ray tracing --

In the Claims

Column 25, Line 37, please replace:
plurality of transformations matrices
With:
-- plurality of transformation matrices --

Signed and Sealed this
Twenty-third Day of January, 2024

Katherine Kelly Vidal
*Director of the United States Patent and Trademark Office*